United States Patent
Reddy et al.

(10) Patent No.: US 7,372,711 B2
(45) Date of Patent: May 13, 2008

(54) CIRCUIT AND METHOD FOR REDUCING VOLTAGE SPIKES DUE TO MAGNETIZING CURRENT IMBALANCES AND POWER CONVERTER EMPLOYING THE SAME

(75) Inventors: Raghothama Reddy, Mesquite, TX (US); Karim Wassef, Murphy, TX (US)

(73) Assignee: Lineage Power Corporation, Mesquite, TX (US)

( * ) Notice: Subject to any disclaimer, the term of this patent is extended or adjusted under 35 U.S.C. 154(b) by 90 days.

(21) Appl. No.: 11/033,195

(22) Filed: Jan. 11, 2005

(65) Prior Publication Data

US 2006/0152950 A1 Jul. 13, 2006

(51) Int. Cl.
*H02M 7/08* (2006.01)
*H02M 7/217* (2006.01)
*H02H 7/122* (2006.01)

(52) U.S. Cl. .................. 363/70; 363/56.12; 363/127

(58) Field of Classification Search ............ 363/56.12, 363/67, 70, 65, 17, 69, 56.04–56.05, 21.04–21.06, 363/21.14, 39, 47–48, 56.06–56.11, 56.01–56.03, 363/52, 53, 127, 84, 125; 323/272, 255, 323/340, 267
See application file for complete search history.

(56) References Cited

U.S. PATENT DOCUMENTS

| | | | | |
|---|---|---|---|---|
| 1,742,682 | A * | 1/1930 | Beers | 363/47 |
| 3,745,440 | A * | 7/1973 | Lord | 363/17 |
| 4,322,817 | A * | 3/1982 | Kuster | 363/26 |
| 4,660,136 | A * | 4/1987 | Montorefano | 363/26 |
| 6,054,674 | A * | 4/2000 | Moriguchi et al. | 219/130.21 |
| 6,344,628 | B1 * | 2/2002 | Nowak et al. | 219/137 PS |
| 6,590,788 | B2 * | 7/2003 | Mercier | 363/21.06 |
| 6,784,644 | B2 * | 8/2004 | Xu et al. | 323/225 |
| 6,930,457 | B2 * | 8/2005 | Zack et al. | 318/139 |
| 7,046,532 | B2 * | 5/2006 | Matsuo et al. | 363/65 |

* cited by examiner

*Primary Examiner*—Jeffrey Sterrett
*Assistant Examiner*—Harry Behm

(57) ABSTRACT

For use in a power converter having parallel power trains, a circuit for, and method of, reducing voltage spikes due to magnetizing current imbalances in the power trains and a power converter incorporating the circuit or the method. In one embodiment, the circuit includes: (1) a conductive bypass path coupling nodes between transformer secondary windings and inductors in each of the power trains and configured to provide an alternative path to redirect magnetizing current imbalances from the inductors and (2) a capacitor located in the conductive bypass path.

17 Claims, 6 Drawing Sheets

CIRCUIT AND METHOD FOR REDUCING VOLTAGE SPIKES DUE TO MAGNETIZING CURRENT IMBALANCES AND POWER CONVERTER EMPLOYING THE SAME

TECHNICAL FIELD OF THE INVENTION

The present invention is directed, in general, to power conversion and more specifically to a circuit and method for reducing voltage spikes due to magnetizing current imbalances and a power converter that employs such circuit or method.

BACKGROUND OF THE INVENTION

Power converters are widely used to provide power having the appropriate electrical characteristics to equipment ("loads"). Power converters convert electric power from one form (e.g., relatively high voltage alternating current, or AC) to another (e.g., lower voltage direct current, or DC). Converters may convert from DC to AC ("inverters"), AC to AC ("cycloconverters"), AC to DC ("rectifiers") or DC to DC ("switch mode power supplies" or "choppers"). Most power converters operate by using magnetic components, such as transformers and inductors, to transfer or filter electric power. Many power converters use solid state switches (transistors) to make and break electrical connections quickly to create multiple paths for electricity through the converter. The multiple paths impart the desired characteristics to the electric power.

Some loads require substantial quantities of electric power and consequently a relatively large power converter. One way to address this need is to provide the converter with larger components (e.g., magnetic components and switches). Unfortunately, larger components have two significant disadvantages. First, they are expensive and harder to obtain in quantity. Second, they are subject to increased variations in operation; magnetic components often vary more widely from one to another in terms of inductance, and switches may vary more from one to another in terms of switching threshold or response time.

Another way to address the need for more output power is to couple multiple smaller power converters in parallel. Each power converter may be thought of and referred to as a "power train." The outputs of the power trains are simply connected together and to the load. This approach avoids the above-noted problems associated with larger components.

Unfortunately, another problem arises; the multiple power trains must work in unison to provide the needed power. However, if the components of one power train differ in their operation from the components in another, the power trains are unbalanced and may actually supply power to one another in addition to the load. Magnetic components typically fall into two categories: transformers and inductors. Transformers typically vary in inductance enough to cause significant circulating magnetizing currents to flow from one power train to another. Imbalanced magnetizing currents forced through inductors, typically located at the output of a power train, cause voltage spikes of such magnitude to overwhelm the rectifying switches changing their electrical characteristics and even destroying them.

The potentially serious problem of magnetizing current imbalance has been dealt with two different ways. In some designs, particular care has been taken to match the characteristics of the magnetic components such that the magnetizing currents are balanced. Unfortunately, matched components are expensive; many components must be manufactured to yield a suitably matched pair.

Other designs add snubber circuits to reduce the voltage spikes resulting from imbalanced magnetizing currents. However, snubber circuits represent additional circuitry and thus additional cost. This approach also typically results in additional power dissipation. Minimizing cost and power dissipation are goals that pervades power converter design efforts.

Accordingly, what is needed in the art is a way to reduce magnetizing current imbalance in parallel power trains that does not require matched magnetic components. What is further needed in the art is a method of reducing voltage spikes that arise as a result of magnetizing current imbalances that does not require snubber circuits and a power converter that employs such circuit or method.

SUMMARY OF THE INVENTION

To address the above-discussed deficiencies of the prior art, the present invention provides, for use in a power converter having parallel power trains, a circuit for reducing voltage spikes due to magnetizing current imbalances in the power trains. In one embodiment, the circuit includes: (1) a conductive bypass path coupling nodes between transformer secondary windings and inductors in each of the power trains and configured to provide an alternative path to redirect magnetizing current imbalances from the inductors and (2) a capacitor located in the conductive bypass path.

In another aspect, the present invention provides a method of reducing voltage spikes due to magnetizing current imbalances in the power trains of a power converter. In one embodiment, the method includes: (1) redirecting magnetizing current imbalances from the inductors with a conductive bypass path coupling nodes between secondary windings and inductors in each of the power trains and (2) blocking DC currents with a capacitor located in the conductive bypass path.

In yet another embodiment, the present invention provides a power converter. In one embodiment, the converter includes: (1) an inverter, (2) a transformer having a primary winding coupled to the inverter, (3) parallel power trains coupled to respective secondary windings of the transformer, (4) a conductive bypass path coupling nodes between the secondary windings and inductors in each of the power trains and configured to provide an alternative path to redirect magnetizing current imbalances from the inductors and (5) a capacitor located in the conductive bypass path.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
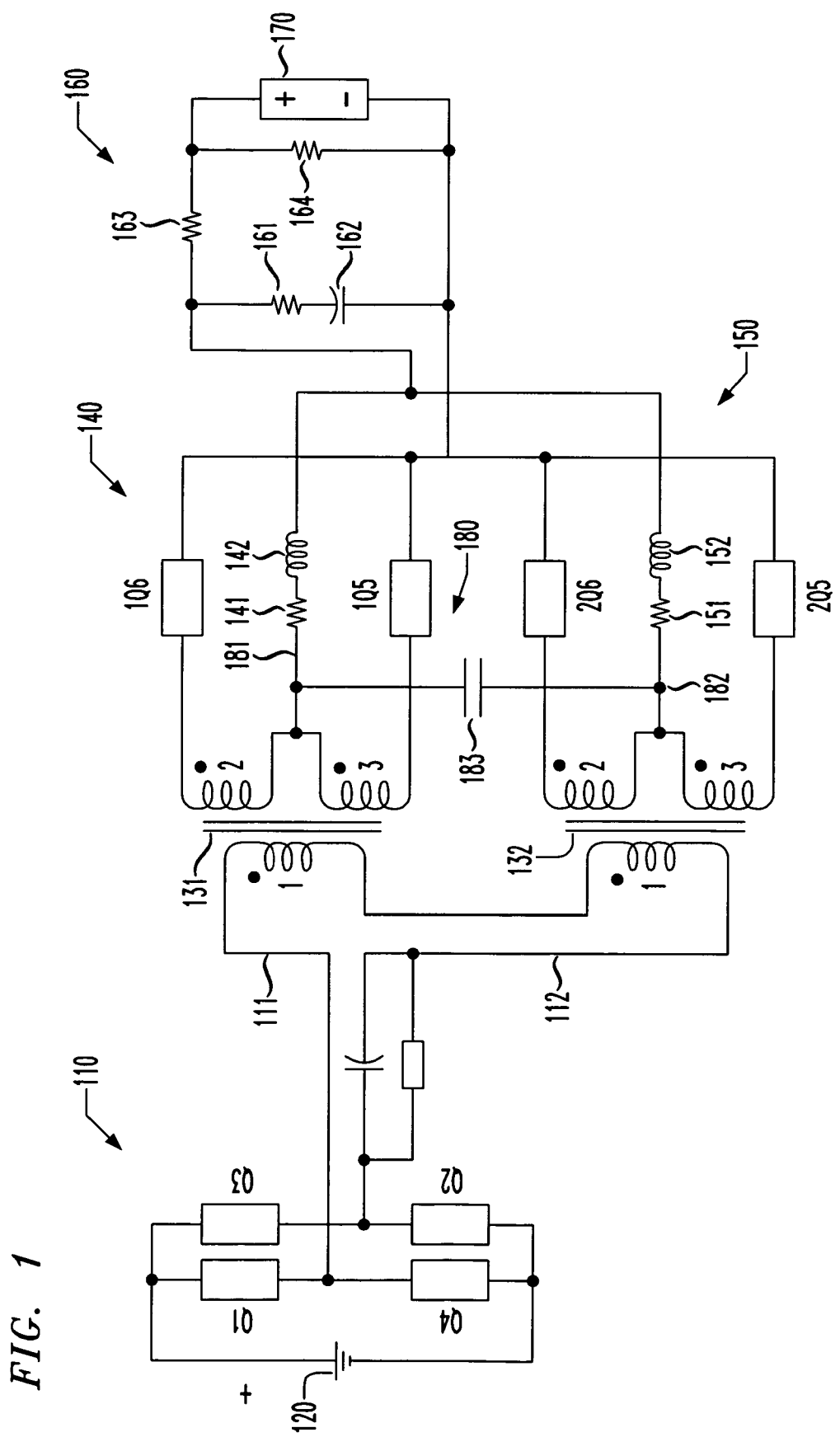
FIG. 1 illustrates a schematic diagram of a power converter having first and second power trains and including one embodiment of a circuit for reducing voltage spikes due to magnetizing current imbalances constructed according to the principles of the present invention.

Referring initially to FIG. 1, illustrated is a schematic diagram of a power converter having first and second power trains. The power converter also includes one embodiment of a circuit for reducing voltage spikes due to magnetizing current imbalances constructed according to the principles of the present invention.

The power converter has an inverter 110 that is coupled to a source of DC input power 120 and includes first, second, third and fourth switches Q1, Q2, Q3, Q4. As will be shown more completely in conjunction with FIGS. 2A-2D, the switches Q1, Q2, Q3, Q4 cooperate to convert the DC power provided at the source of DC input power 120 into square-wave AC power suitable for charging the electromagnetic field of transformers 131, 132 to alternate polarities. A bus having first and second rails 111, 112 conveys the square-wave AC power to the transformers 131, 132.

A primary winding "1" is associated with each of the transformers 131, 132 and is coupled to the inverter 110. Secondary windings "2" and "3" are also associated with each of the transformers 131, 132. The secondary windings "2" and "3" are also each associated with parallel first and second power trains 140, 150.

As can be seen in FIG. 1, outputs of the parallel first and second power trains 140, 150 are directly connected together. This allows the parallel first and second power trains 140, 150 to act in concert to supply electric power via an output filter 160 to a load 164, which may be, for example, electronic equipment of any type. The output filter 160 is illustrated as including conventional filter elements 161, 162, 163. A load monitoring device 170 may be associated with the load 164.

Each of the parallel first and second power trains 140, 150 includes switches that act in concert with the switches Q1, Q2, Q3, Q4 of the inverter 110 to deliver power to the load 170. The first power train 140 has a fifth switch 1Q5 and a sixth switch 1Q6. The second power train 150 has a fifth switch 2Q5 and a sixth switch 2Q6.

Each of the parallel first and second power trains 140, 150 also includes an output resistor and an output inductor. The first power train 140 has a first output resistor 141 and a first output inductor 142. The second power train 150 has a second output resistor 151 and a second output inductor 152. As described above, and to be described below in greater detail in conjunction with FIGS. 2A-2D, the operation of the parallel first and second power trains 140, 150 depend upon the magnetic characteristics of their respective first and second output inductors 142, 152 and the magnetic characteristics of the first and second transformers 131, 132.

If the first and second transformers 131, 132 have substantially identical characteristics (are "matched"), the power converter as a whole will operate properly. However, if the first and second transformers 131, 132 are or become mismatched, the operation of the parallel first and second power trains 140, 150 become imbalanced. This causes imbalanced magnetizing currents to be developed between the parallel first and second power trains 140, 150. The voltage spikes resulting fro these magnetizing currents may alter the operation of, or utterly destroy, one or more of the fifth and sixth switches 1Q5, 1Q6, 2Q5, 2Q6 in the first and second power trains 140, 150, respectively.

The present invention addresses this significant limitation and problem by introducing into the power converter a conductive bypass path 180. The conductive bypass path 180 provides a new path that allows magnetizing current imbalances to be redirected away from the output magnetic components (i.e., the first and second output inductors 142, 152) and therefore reduce (preferably substantially) the resulting voltage spikes that would otherwise alter the behavior of the rectifying switches 1Q5, 1Q6, 2Q5, 2Q6. Because it is desirable to bypass the output magnetic components, the conductive bypass path 180 couples nodes 181, 182 between the secondary windings "2" and "3" and the first and second output inductors 142, 152 in each of the parallel first and second power trains 140, 150.

As shown in FIG. 1, a capacitor 183 is located in the conductive bypass path 180. The capacitor 183 functions to block DC currents from traversing the conductive bypass path 180. Thus, the first and second output inductors 142, 152 remain in the path by which DC power is conducted to the output filter 160.

Having described the structure of an exemplary embodiment of a power converter including a circuit constructed according to the principles of the present invention, the power converter's states of operation may now be described. Accordingly, turning now to FIGS. 2A-2D, illustrated are the power converter of FIG. 1 in respective first, second, third and fourth states of operation. The function of the first and third states is to charge the electromagnetic field of the transformers 131, 132 while allowing alternating forward paths to supply electric power to the load 164. The function of the second and fourth states is to discharge the electromagnetic field of the transformer into the parallel first and second power trains 140, 150 and thereby effect a supply of electric power to the load 164.

Figure 2A:
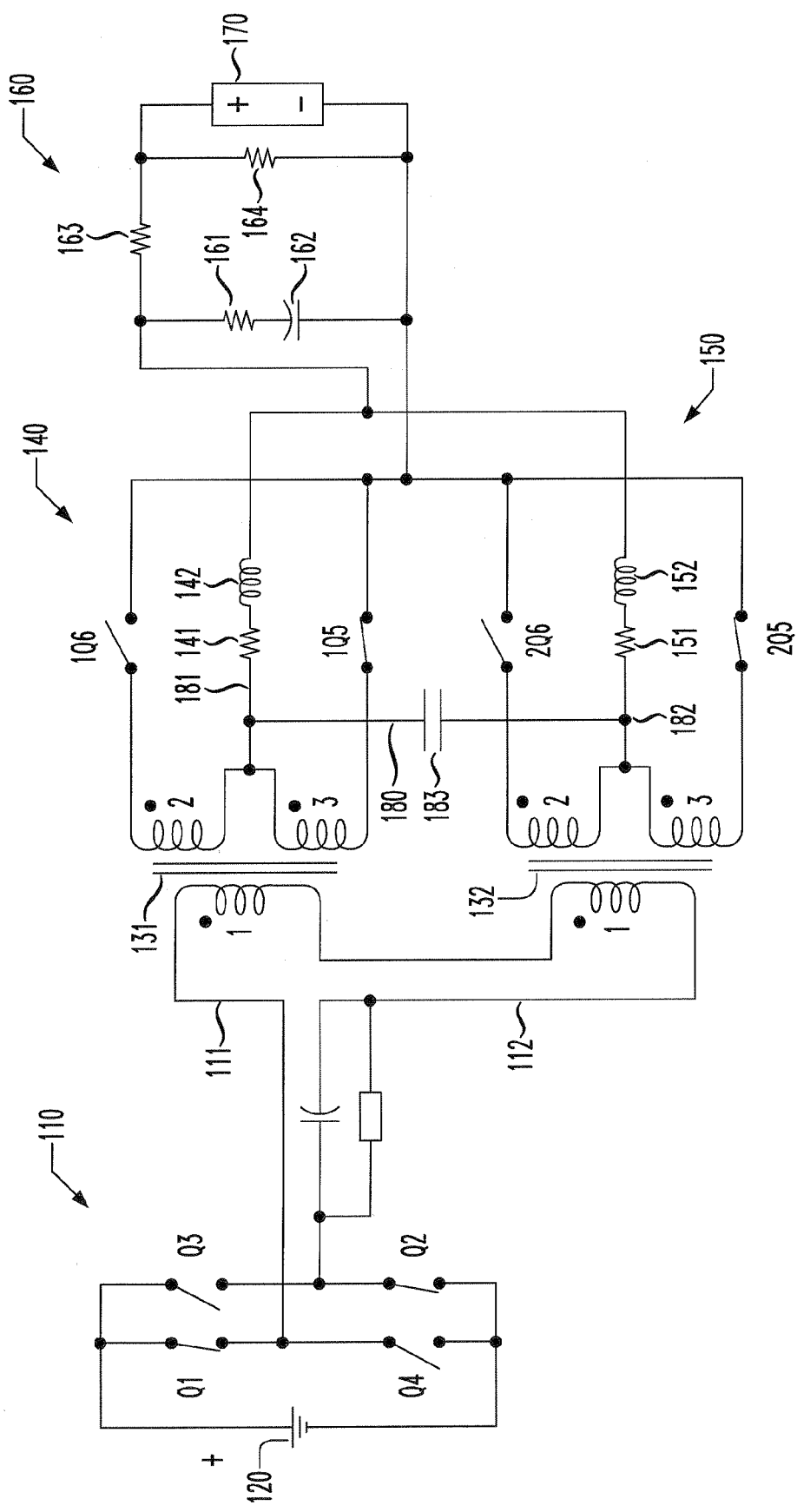
FIGS. 2A-2D illustrate the power converter of FIG. 1 in respective first, second, third and fourth states of operation.

Beginning in FIG. 2A, the first state of operation will now be described. The specific function of the first state is to charge the electromagnetic field of the transformers 131, 132 to a positive polarity. Thus, the switches Q1 and Q2 are closed to couple the first and second rails 111, 112 respectively to the positive and negative terminals of the source of DC input power 120. The switches 1Q6 and 2Q6 are opened to interrupt part of the flow of power through the parallel first and second power trains 140, 150. The switches 1Q5 and 2Q5 are closed to direct the flow of power through part of the parallel first and second power trains 140, 150.

With this configuration, current flows in a loop from the positive terminal of the source of DC input power 120, through the switch Q1, along the first rail 111, through the primary winding "1" of the transformer 131, through the primary winding "1" of the transformer 132, along the second rail 112 and back through the switch Q2 to the negative terminal of the source of DC input power 120. By this flow, the electromagnetic fields of the transformers 131, 132 are substantially charged to a positive polarity. The power converter now transitions to the second state.

Figure 2B:
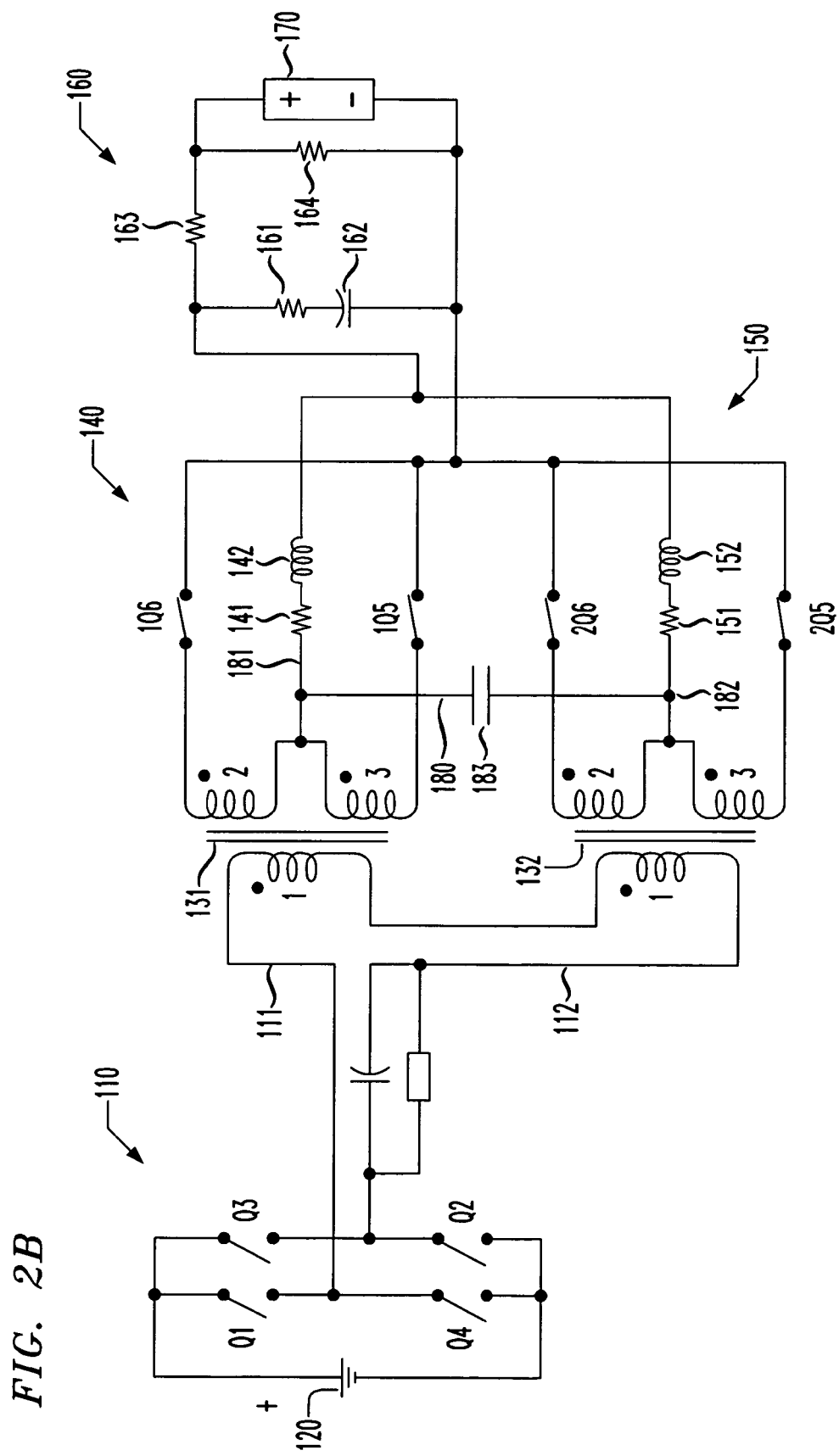

Proceeding to FIG. 2B, the second state of operation will now be described. Since the electromagnetic fields of the transformers 131, 132 are now to be discharged, the switches Q1 and Q2 are now opened, and the switches Q3 and Q4 remain open. This fully decouples the transformers 131, 132 from the source of DC input power 120. The switches 1Q6 and 2Q6 are now closed, and the switches 1Q5 and 2Q5 remain closed.

With this configuration, current flows through the first power train 140 in two loops. The first loop is through the switch 1Q5, then through the secondary winding "3" of the transformer 131. The second loop is through the switch 1Q6, then through the secondary winding "2" of the transformer 131. Net current flows into the first output inductor 142 toward the load 164. This causes power to be delivered through the first output resistor 141 and the first output inductor 142 to the output of the first power train 140. Likewise, current flows through the second power train 150 in two loops. The first loop is through the switch 2Q5, then through the secondary winding "3" of the transformer 132. The second loop is through the switch 2Q6, then through the secondary winding "2" of the transformer 132. Net current flows into the first output inductor 152 toward the load 164. This causes power to be delivered through the second output resistor 151 and the second output inductor 152 to the output of the second power train 150. By these flows, the electromagnetic field of the transformers 131, 132 is substantially discharged. The power converter now transitions to the third state.

Figure 2C:
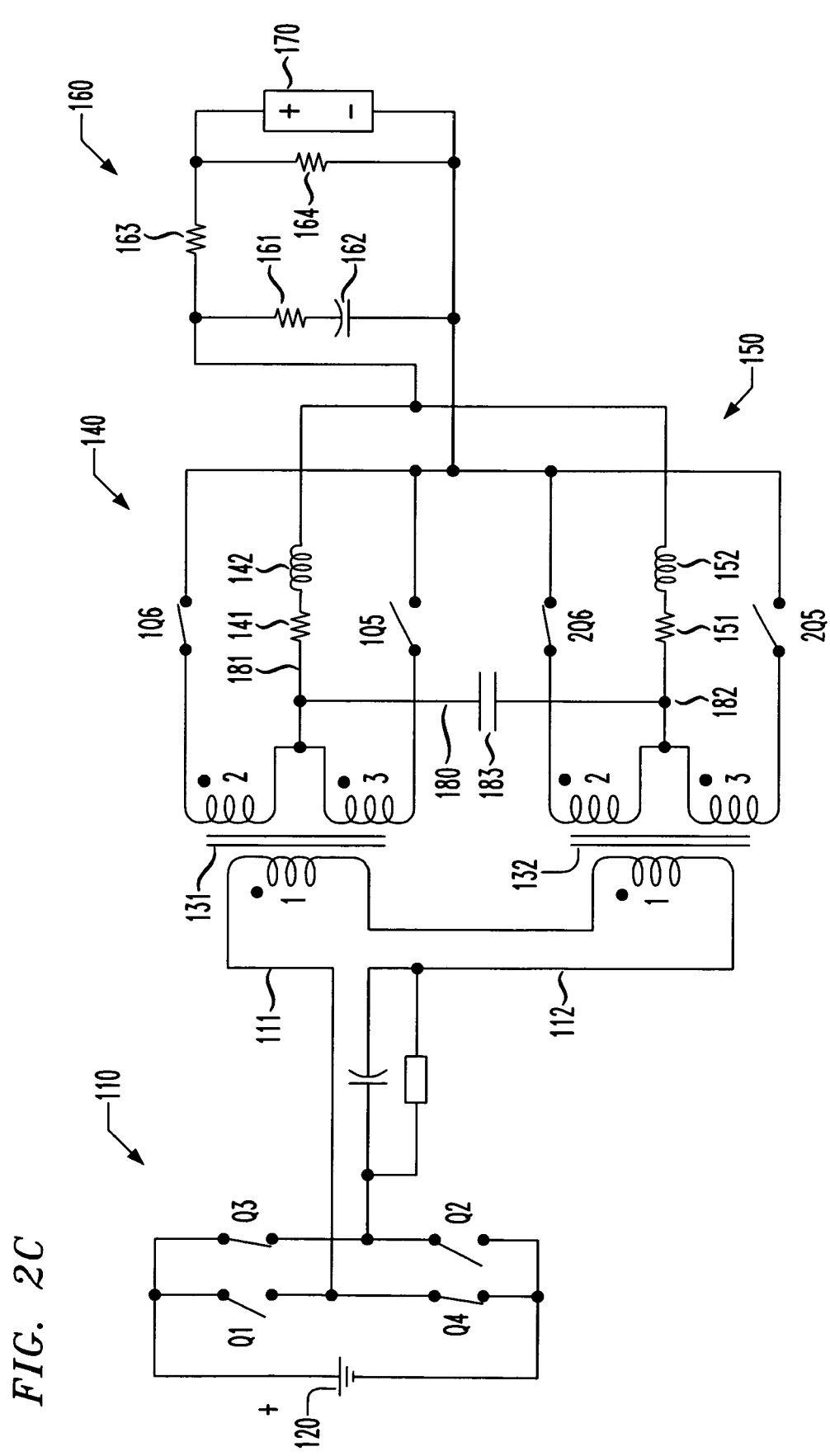

Proceeding to FIG. 2C, the third state of operation will now be described. The specific function of the third state is to charge the electromagnetic field of the transformers 131, 132 to a negative polarity. Thus, the switches Q3 and Q4 are closed to couple the first and second rails 111, 112 respectively to the negative and positive terminals of the source of DC input power 120. The switches 1Q5 and 2Q5 are opened to interrupt part of the flow of power through the parallel first and second power trains 140, 150. The switches 1Q6 and 2Q6 are closed to direct the flow of power through part of the parallel first and second power trains 140, 150.

With this configuration, current flows in a loop from the positive terminal of the source of DC input power 120, through the switch Q3, along the second rail 112, through the primary winding "1" of the transformers 131, 132, along the first rail 111 and back through the switch Q4 to the negative terminal of the source of DC input power 120. By this flow, the electromagnetic field of the transformers 131, 132 is substantially charged to a negative polarity. During this state, the secondary winding "2" of the transformer 131 and the secondary winding "2" of the transformer 132 direct a forward flow of power toward the load 164. The power converter now transitions to the fourth state.

Figure 2D:
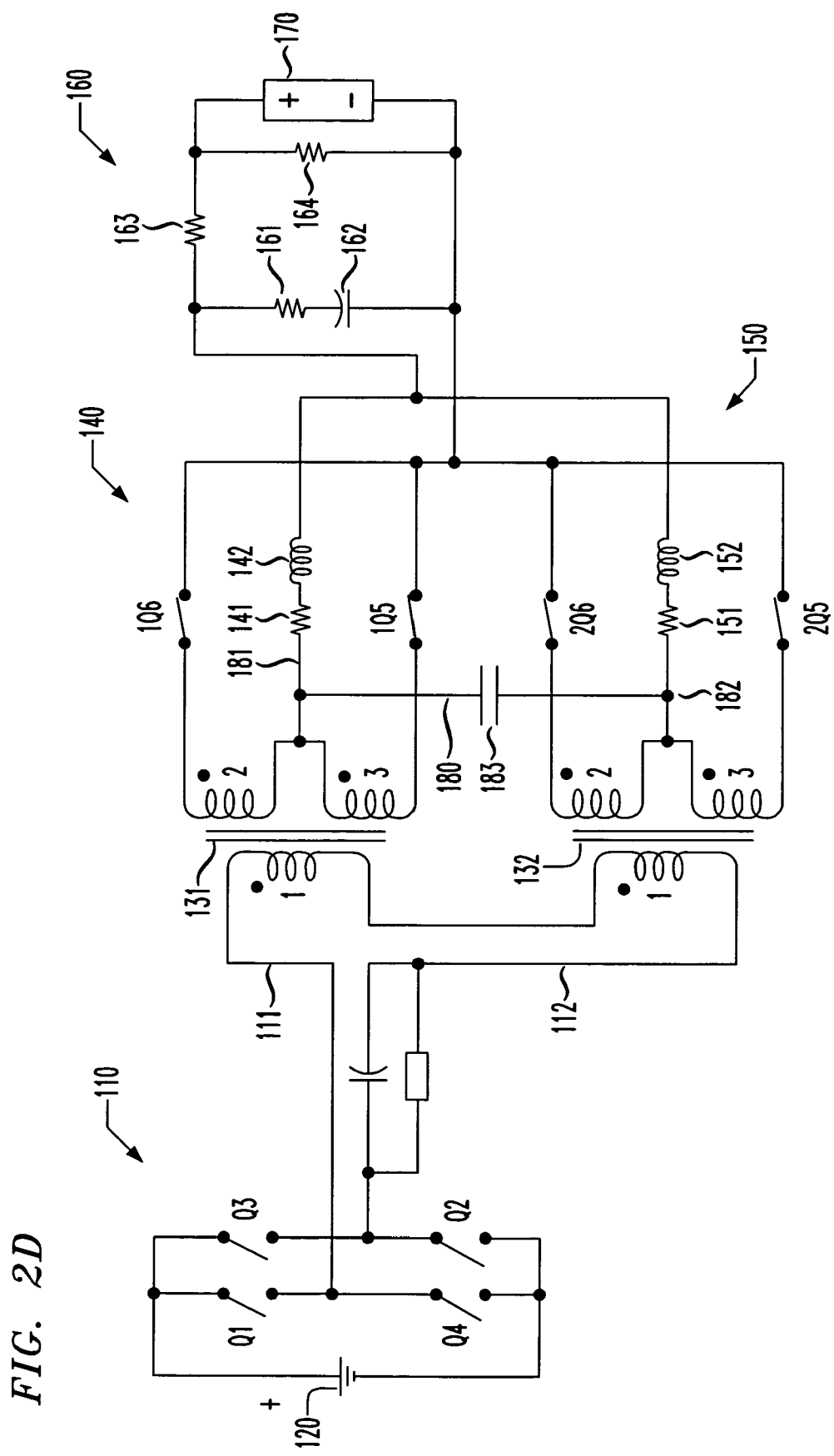

Proceeding to FIG. 2D, the fourth state of operation will now be described. Since the electromagnetic field of the transformers 131, 132 is now to be discharged, the switches Q3 and Q4 are now opened, and the switches Q1 and Q2 remain open. This fully decouples the transformers 131, 132 from the source of DC input power 120. The switches 1Q5 and 2Q5 are now closed, and the switches 1Q6 and 2Q6 remain closed.

With this configuration, current flows through the first power train 140 in two loops. The first loop is through the switch 1Q5, then through the secondary winding "3" of the transformer 131. The second loop is through the switch 1Q6, then through the secondary winding "2" of the transformer 131. Net current flows into the first output inductor 142 toward the load 164. This causes power to be delivered through the first output resistor 141 and the first output inductor 142 to the output of the first power train 140. Likewise, current flows through the second power train 150 in two loops. The first loop is through the switch 2Q5, then through the secondary winding "3" of the transformer 132. The second loop is through the switch 2Q6, then through the secondary winding "2" of the transformer 132. Net current flows into the first output inductor 152 toward the load 164. This causes power to be delivered through the second output resistor 151 and the second output inductor 152 to the output of the second power train 150. By these flows, the electromagnetic field of the transformers 131, 132 is again substantially discharged, and the power converter transitions back to the first state.

The present invention addresses a problem that occurs during the transition from the second state to the third state and again during the transition from the fourth state back to the first state. During these transitions, if the first and second transformers 131, 132 are mismatched, and in the absence of a conductive bypass path 180, a potentially harmful magnetizing current almost certainly flows between the first and second power trains 140, 150.

More specifically, during the transition from the second state to the third state, as the switches Q3 and Q4 are closed, a magnetizing current almost certainly flows in a loop from the secondary winding "2" of the first power train 140, through the first output resistor 141 and the first output inductor 142, backwards through the second output inductor 152 and the second output resistor 151, through the secondary winding "2" of the second power train 150, through the switches 2Q6 and 1Q6 and back to the secondary winding "2" of the first power train 140.

During the transition from the fourth state to the first state, as the switches Q1 and Q2 are closed, a magnetizing current almost certainly flows in a loop from the secondary winding "3" of the first power train 140, through the switches 1Q5 and 2Q5, through the secondary winding "3" of the second power train 150, through the second output resistor 151 and the second output inductor 152, backwards through the first output inductor 142 and the first output resistor 141 and back to the secondary winding "3" of the first power train 140.

To avoid this potentially damaging effect, the conductive bypass path 180 conducts the magnetizing currents before they reach the first and second output inductors 142, 152 during both transitions. With the conductive bypass path 180 in place, the following occurs instead.

More specifically, during the transition from the second state to the third state, as the switches Q3 and Q4 are closed, the magnetizing current instead almost certainly flows in a loop from the secondary winding "2" of the first power train 140, through the node 181, through the conductive bypass path 180 (including the capacitor 183), through the node 182, through the secondary winding "2" of the second power train 150, through the switches 2Q6 and 1Q6 and back to the secondary winding "2" of the first power train 140.

During the transition from the fourth state to the first state, as the switches Q1 and Q2 are closed, the magnetizing current instead almost certainly flows in a loop from the secondary winding "3" of the first power train 140, through the switches 1Q5 and 2Q5, through the secondary winding "3" of the second power train 150, through the node 182, through the conductive bypass path 180 (including the capacitor 183), through the node 181 and back to the secondary winding "3" of the first power train 140.

Figure 3:
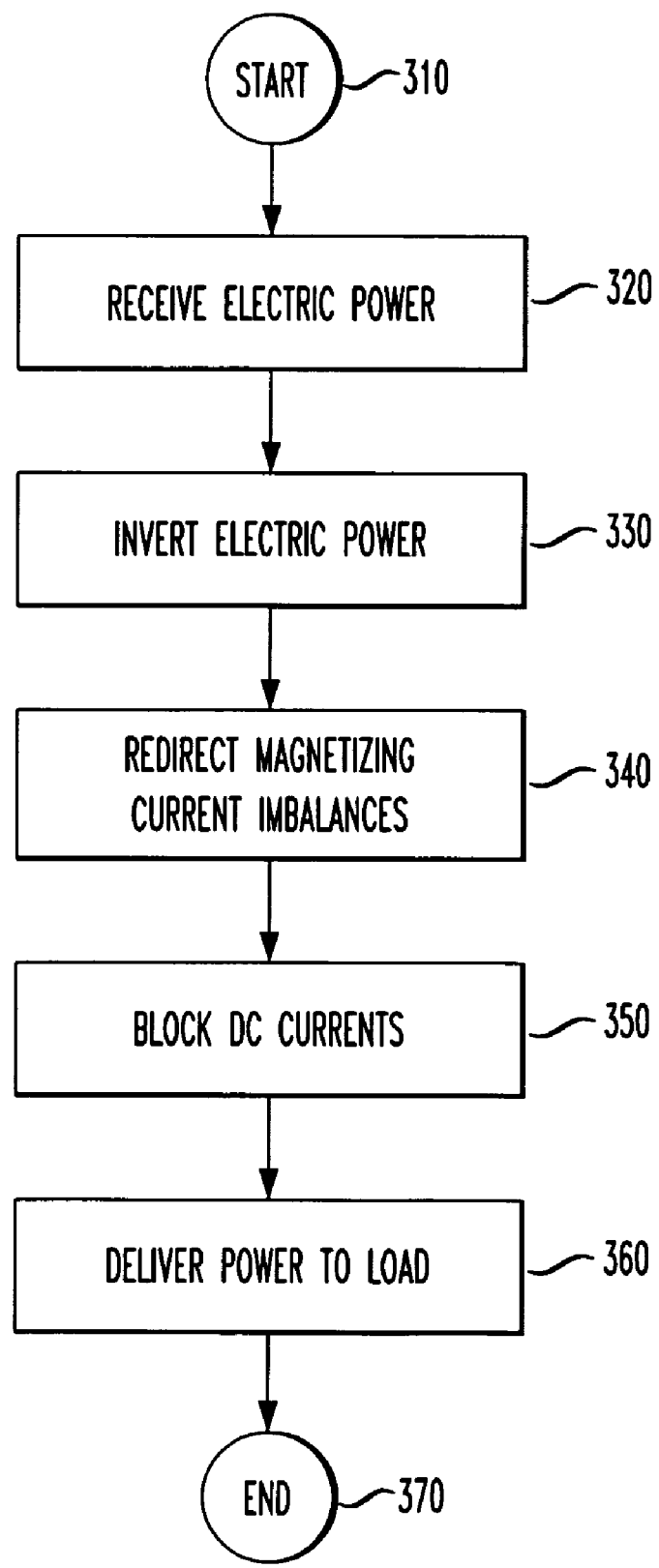
FIG. 3 illustrates a flow diagram of one embodiment of a method of reducing voltage spikes due to magnetizing current imbalances carried out according to the principles of the present invention.

Having described the power converter's states of operation and the function of one embodiment of a conductive bypass path constructed according to the principles of the present invention, an exemplary method of reducing voltage spikes due to magnetizing current imbalances may now be described. Accordingly, turning now to FIG. 3, illustrated is a flow diagram of one embodiment of a method of reducing voltage spikes due to magnetizing current imbalances carried out according to the principles of the present invention.

The method begins in a start step 310, wherein it is desired to convert and provide electric power to a load. In a step 320, electric power is received from a source of DC input power. In a step 330, the electric power is inverted and directed into parallel power trains.

In a step 340, magnetizing current imbalances are redirected from the output magnetic components into a conductive bypass path that couples nodes between secondary windings and output magnetic components in each of the power trains. In a step 350, DC currents are blocked with a capacitor located in the conductive bypass path. In a step 360, the bulk of the electric power is delivered to the load via an output filter. The method ends in an end step 370.

Although the present invention has been described in detail, those skilled in the art should understand that they can make various changes, substitutions and alterations herein without departing from the spirit and scope of the invention in its broadest form.

What is claimed is:

1. For use in a power converter having parallel power trains, a circuit for reducing voltage spikes due to magnetizing current imbalances in said parallel power trains, comprising:
    a first and second node that are coupled, respectively, to a first and second center tap of transformer secondary windings;
    a conductive bypass path coupling said first and second nodes between said transformer secondary windings and inductors in each of said parallel power trains and configured to provide an alternative path to redirect magnetizing current imbalances from said inductors, wherein the conductive bypass path couples the parallel power trains and redirects at least part of a potentially damaging magnetizing current to prevent said potentially damaging magnetizing current from traversing both of said inductors in said parallel power trains, and wherein said conductive bypass path further prevents a reverse polarization of current in at least one of said inductors; and
    a capacitor located in said conductive bypass path that blocks a DC current between said parallel power trains.

2. The circuit as recited in claim 1 wherein said power converter has an inverter coupled to a primary winding of a transformer.

3. The circuit as recited in claim 1 wherein said power converter has only two power trains.

4. The circuit as recited in claim 1 wherein said power converter has an output filter on an output thereof.

5. The circuit as recited in claim 1, wherein within said conductive bypass path there are no current sources or current sinks.

6. The circuit as recited in claim 1, wherein said capacitor is not connected to a grounded element.

7. For use in a power converter having parallel power trains, a method of reducing voltage spikes due to magnetizing current imbalances caused by transformers in said parallel power trains, comprising:
    redirecting magnetizing current imbalances from an inductor within each power train with a conductive bypass path coupling nodes between a first and second center tap of transformer secondary windings and inductors in each of said parallel power train, wherein the conductive bypass path couples the parallel power trains, and wherein said conductive bypass path redirects at least part of a potentially damaging magnetizing current to prevent said potentially damaging magnetizing current from traversing at least one said of inductors in at least one of said power trains; and
    blocking DC currents between each of said parallel power trains with a capacitor located in said conductive bypass path, wherein said capacitor is not connected to a grounded element.

8. The method as recited in claim 7 wherein said power converter has an inverter coupled to a primary winding of a transformer.

9. The method as recited in claim 7 wherein said power converter has only two power trains.

10. The method as recited in claim 7 wherein said power converter has an output filter on an output thereof.

11. The method as recited in claim 7, wherein within said conductive bypass path there are no current sources or current sinks.

12. The method as recited in claim 7, further comprising:
    redirecting at least part of said potentially damaging magnetizing current to prevent said potentially damaging magnetizing current from serially traversing both of said inductors in said power trains, and
    preventing, by said conductive bypass path, a reverse polarization of current in at least one of said inductors.

13. A power converter, comprising:
    an inverter;
    a transformer having a primary winding coupled to said inverter;
    parallel power trains coupled to respective transformer secondary windings of said transformer;
    a first and second node that are coupled, respectively, to a first and second center tap of said secondary windings;
    a conductive bypass path coupling said first and second nodes between said secondary windings and inductors in each of said parallel power trains and configured to provide an alternative path to redirect magnetizing current imbalances from said inductors, wherein the conductive bypass path couples the parallel power trains and redirects at least part of a potentially damaging magnetizing current to prevent said potentially damaging magnetizing current from traversing both of said inductors in said parallel power trains; and
    a capacitor located in said conductive bypass path that blocks a DC current between said parallel power trains, wherein said conductive bypass path further prevents a reverse polarization of current in at least one of said inductors.

14. The converter as recited in claim 13 wherein said power converter has only two power trains.

15. The converter as recited in claim 13 wherein said power converter has an output filter on an output thereof.

16. The method as recited in claim 13, wherein within said conductive bypass path there are no current sources or current sinks.

17. The power converter of claim 13, wherein said capacitor is not connected to a grounded element.

* * * * *